3,210,461
ELECTRICAL STRESS-GRADING COATINGS
Daniel Berg, Churchill Boro, and Paul J. Malinaric, Pittsburgh, Pa., assignors to Westinghouse Electric Corporation, East Pittsburgh, Pa., a corporation of Pennsylvania
Filed Oct. 12, 1962, Ser. No. 230,171
6 Claims. (Cl. 174—127)

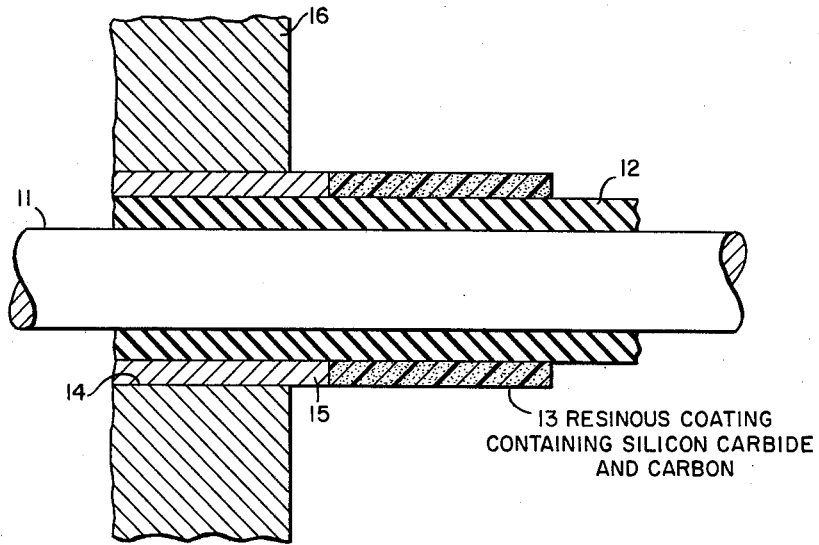

Compositions comprising conductive particles suspended in an organic or resinous film forming medium have been employed to produce resistive or semiconducting coatings on high voltage electrical equipment. Films or coatings so produced are useful in eliminating or reducing corona, thereby eliminating a possible source of rapid insulation degradation and consequent equipment failure.

In the past, electrical stress-grading varnishes containing a high resistivity carbon powder have been used on high voltage generator coils to prevent corona at the point where the coils leave the grounded stator. The varnish has also been used to coat paper to prevent the occurrence of corona at foil edges in foil-wound condenser bushings.

More recently, film-forming or coating compositions containing certain particulated or finely divided silicon carbides have been found advantageous as electrical stress-grading materials. The resistivity of these silicon carbide coatings is non-linear, i.e., the resistivity varies with the voltage, whereas the resistivity of the carbon powder coatings is ohmic or linear and thus remains constant irrespective of voltage. Since the silicon carbide coatings are continuous, non-linear and self-adjusting voltage dividers, they offer profound improvement over the continuous voltage dividers previously employed, as for example, the heretofore described linear carbon coatings.

Another important consideration in the selection of stress-grading coatings, and compositions therefor, is the change in properties of such coatings in service. In service, they are exposed to high voltage gradients and varied environmental conditions such as heat and humidity. It is desirable to have coatings which maintain their quantitative resistive properties in service. Neither the linear carbon nor the non-linear silicon carbide coatings known heretofore have been capable of substantially maintaining original resistive properties for prolonged periods of service.

Accordingly, it is a general object of this invention to provide non-linear electrical stress-grading coatings, and compositions therefor, which maintain their original properties after prolonged exposure to high voltage gradients and other environmental conditions.

A more specific object of this invention is to provide a liquid resinous film-forming composition containing silicon carbide and carbon, capable of producing non-linear electrical stress-grading coatings which will substantially maintain the original resistivity after aging.

Yet another object of this invention is to provide non-linear electrical stress-grading coatings containing a filler of non-linear particulated or finely divided silicon carbide and carbon.

Briefly, the present invention accomplishes the above-cited objects by providing a stress-grading filler for coating compositions of non-linear particulated silicon carbide and carbon, the carbon composing from about 0.5% to about 4%, by weight of the silicon carbide. Such compositions may be employed to produce coatings on high voltage electrical equipment to eliminate or reduce corona and essentially ensure the maintenance of the original resistivity of the coating on exposure to typical environments.

Further objects and advantages of this invention will become apparent as the following description proceeds and features of novelty which characterize the invention will be pointed out in particularity in the claims annexed to and forming a part of this specification.

For a better understanding of this invention, reference may be had to the accompanying drawing, in which the figure is a partially sectioned view illustrating a stator core and coil of a high voltage generator.

It has now been discovered that adding from about 0.5% up to about 4% of finely divided or powdered carbon, based on the weight of the silicon carbide, has a dramatic and unexpected beneficial effect on the aging or resistivity change of non-linear silicon carbide stress-grading coatings. The aging mechanism has not been clearly established. It has been established that exposure to electrical stress and typical environments increases the resistivity of both the non-linear silicon carbide and powdered carbon stress-grading coatings. Surprisingly, when the described amount of carbon is added to a coating containing the silicon carbide, property losses on aging are arrested.

In order to possess the desired non-linear resistive properties, the silicon carbide must contain small amounts of impurities such as aluminum or phosphorus. The typical commercial grades of silicon carbide do posses such impurities and the desired properties. Typical commercial proprietary materials are available, for example, as Carbotronic silicon carbide from the Carborundum Company and as electrical grade from the Norton Company.

The non-linearity of the silicon carbide powder may be determined by measuring voltage at various currents in a cylindrical column having a diameter of one inch. The powder is placed in the column between electrodes at a pressure of 400 p.s.i. The current will be proportional to the voltage raised to a power according to the formula:

$I = kV^n$. For satisfactory non-linear stress-grading coatings, $n$ should be at least 2. Materials with an $n$ value as high as 7 have been employed.

While particle size will influence the resistivity range to some extent, it is not a critical property. Silicon carbide powders with an average particle size of from about 100 to 1000 mesh may be employed. The carbon powder may be employed in the same size range.

The following examples will specifically illustrate the invention and attending advantages.

*Example I*

Material:                                Proportions, parts by weight
    Non-linear silicon carbide (400 grit) _____ 6
    Chlorofluorocarbon resin (Firestone Exon 461)__ 1
    Toluene _____ 4

The foregoing composition, thoroughly mixed so that the silicon carbide particles were in uniform suspension, was applied to generator test bars to provide a coating approximately 10 mils thick. After 400 hours at 20 kv. (R.M.S.) in air, the coatings were discolored and greatly eroded due to aging and corona attack.

*Example II*

Material:                                Proportions, parts by weight
    Non-linear silicon carbide (400 grit) and Carbon
      (Molacco Black) 3%, by weight of SiC _____ 6
    Chlorofluorocarbon resin (Firestone Exon 461)__ 1
    Toluene _____ 4

The foregoing composition, thoroughly mixed so that the silicon carbide and carbon particles were in uniform suspension, was applied to generator test bars to provide a coating approximately 10 mils thick. After 400 hours at 20 kv. (R.M.S.) in air, these coatings exhibited little or no change in color and showed no evidence of erosion.

Referring now to the figure, we have illustrated a copper conductor or coil 11 with insulation 12 disposed about the conductor. The stress-grading coating 13, in accordance with this invention, is disposed on the insulation 12 so as to prevent corona where the coils 11 leave the grounded stator core 16. The slot 14 portion of the coil 11 is coated with a conductive paint 15 in a manner known in the art. The stress-grading coating will maintain the desired level of resistivity for prolonged periods of time, maintain a uniform corona starting voltage and prevent erosion and degradation.

It is to be understood that although it is preferable to employ coating-compositions and coatings containing about 3% of finely divided carbon, by weight of silicon carbide, as little as 0.5% of carbon is effective in reducing the resistivity increase normally encountered in service with prior materials. If the carbon content is increased to more than about 4%, by weight of silicon carbide, the coating becomes linearly resistive and loses the advantage of non-linearity described.

The proportion of the non-linear silicon carbide to resin solids is not critical and may vary, in weight proportion, from about equal parts of non-linear silicon carbide and resin to about 6 parts of resin to 1 part of non-linear silicon carbide. It will be understood, of course, that the non-linear silicon carbide content will influence the resistivity range of the coating. Since a specific resistive range may be advantageous in a particular application, a specific non-linear silicon carbide to resin solids ratio may be selected within the above range. The resistivity range of a particular composition may be easily determined by those skilled in the art. Although 400 grit silicon carbide particles and carbon particles having an average particle size of 83 microns were employed in the example, there appears to be no criticality attached to the respective particle sizes. It is, of course, advantageous to employ particle sizes which will permit a uniform dispersion of the particles in the liquid coating composition and the film coating.

While there have been shown and described what are at present considered to be the preferred embodiments of the invention, modifications thereto will readily occur to those skilled in the art. It is not desired, therefore, that the invention be limited to the specific arrangement shown and described, and it is intended to cover in the appended claims all such modifications as fall within the true spirit and scope of the invention.

We claim as our invention:

1. An electrical stress-grading composition comprising, in combination, an admixture of a liquid resin, particulated non-linear silicon carbide and from 0.5% to 4%, based on the weight of non-linear silicon carbide, of particulated carbon.

2. An electrical stress-grading composition comprising, in combination, an admixture of a liquid resin, finely divided non-linear silicon carbide and finely divided carbon, the carbon being present in the order of 3%, based on the weight of non-linear silicon carbide.

3. An electrical stress-grading composition comprising a solidified resin having non-linear silicon carbide particles dispersed throughout the resin and from 0.5 to 4%, based on the weight of non-linear silicon carbide, of carbon particles throughout said resin.

4. An electrical stress-grading composition, comprising a solidified resin having finely divided non-linear silicon carbide and finely divided carbon particles dispersed throughout said resin, the concentration of finely divided carbon being 3%, by weight of non-linear silicon carbide.

5. In an insulated electrical member adapted for high voltage use having, in combination, an electrical member, electrical insulation disposed about said member and an electrical stress-grading coating deposited on said insulation, the improvement comprising having the stress-grading coating comprise a resin having finely divided non-linear silicon carbide particles and carbon particles dispersed throughout said resin, the carbon particles being present in the range of 0.5% to 4%, by weight of non-linear silicon carbide particles.

6. In an insulated electrical member adapted for high voltage use having, in combination, an electrical member, electrical insulation disposed about said member and an electrical stress-grading coating deposited on said insulation, the improvement comprising having the stress-grading coating comprise a resin having finely divided non-linear silicon carbide and finely divided carbon dispersed throughout said resin, the concentration of finely divided carbon being 3%, by weight of non-linear silicon carbide.

References Cited by the Examiner

UNITED STATES PATENTS

| | | | |
|---|---|---|---|
| 2,188,693 | 1/40 | Thompson | 252—516 X |
| 2,512,459 | 6/50 | Hamilton | 174—110 X |
| 2,861,961 | 11/58 | Harris | 252—516 |
| 2,959,563 | 11/60 | Haehn | 252—63.2 X |
| 3,066,180 | 11/62 | Virsberg et al. | 174—73 X |

JOHN F. BURNS, *Primary Examiner.*

JOHN P. WILDMAN, E. JAMES SAX, DARRELL L. CLAY, *Examiners.*